Patented Oct. 30, 1928.

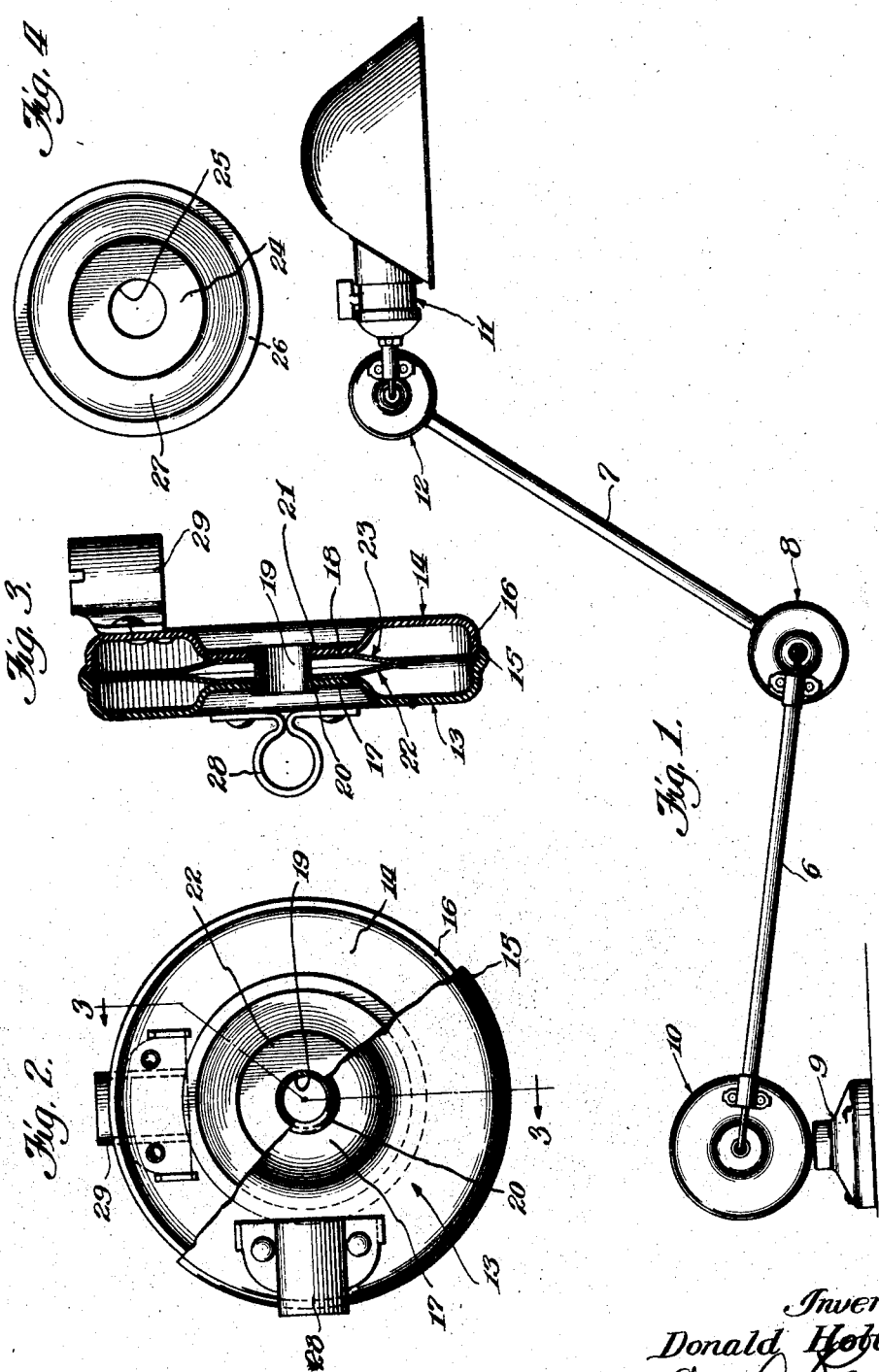

1,689,488

UNITED STATES PATENT OFFICE.

DONALD HOLT, OF CHICAGO, ILLINOIS.

LIGHTING FIXTURE AND THE LIKE.

Application filed September 30, 1927. Serial No. 223,084.

This invention has to do with certain improvements in lighting fixtures and the like. The invention has reference particularly to improvements in the swivel joints of lighting fixtures by means of which joints the fixture arms may be turned into different positions with respect to each other.

The lighting fixtures herein disclosed are of the general type in which use is made of a bracket arm with proper supporting means whereby one end is supported upon or attached to any suitable article or support such as a desk, table, wall, machine tool, lathe or other support of whatsoever kind.

The main object of the present invention is to provide an improved construction of joint between the arms, which joint is so constructed that it will establish the desired amount of frictional engagement or resistance between the movements of the arms so as to hold said arms in any adjusted position with enough force to meet ordinary conditions under which the device is used. Nevertheless, the joint is so constructed that the arms can be easily turned at the joint and merely by the application of a force sufficient to overpower the frictional resistance.

The arrangement is also such that when the joint is moved the parts will not bind, which would cause a jerky and irregular movement. On the contrary the arrangement is such that the adjustments will be made in a smooth and uniform manner, the contacting surfaces sliding smoothly upon each other and without lubrication.

In connection with the foregoing I may state that I have discovered that phosphor bronze is a most excellent material from which to form the friction spring disks; and I have discovered that in addition to its natural springiness or resiliency two disks of this metal when rubbed against each other will not only operate with a substantial amount of friction, but without tendency to stick or bind in an irregular manner.

A further feature of the invention consists in the formation of the friction spring disks of such shape that the surfaces of frictional engagement under spring pressure are established at the maximum radius from the center of rotation and therefore at the most effective point. At the same time the maximum amount of resiliency and springiness is secured so that the most advantageous manufacturing and assembling conditions are made available.

A further feature of the invention is to provide a mechanical construction such that it can be very easily manufactured and assembled from a small number of parts and at low cost, which parts may be readily produced in quantities by well understood manufacturing processes.

Other objects and uses of the invention will appear from a detailed description of the same which consists in the features of construction and combinations of parts hereinafter described and claimed.

In the drawing:

Figure 1 shows a side elevation of a lighting fixture embodying the features of the present invention and showing the relationship of the joint members of the different arms;

Figure 2 shows a face view of one of the joint members on enlarged scale as compared to Fig. 1, a portion of the covering plate being broken away so as to reveal the interior construction;

Fig. 3 shows a cross section on the line 3—3 of Fig. 2 looking in the direction of the arrows and;

Fig. 4 shows a face view of one of the spring disks.

I will state in the first place that I have chosen to illustrate the features of the present invention as being embodied within a fixture of the general type illustrated in my co-pending application for Letters Patent of the United States, Serial No. 193,554, which was filed May 23, 1927. The features of the present invention refer particularly to the construction of the joints between the bracket arms; and the construction of joint herein disclosed is very well adapted for use with bracket constructions of the general type shown in the aforesaid application. Nevertheless I do not intend to limit myself thereto except as I may do so in the claims.

The bracket herein disclosed includes the arms 6 and 7 joined together by a joint fixture 8. The arm 6 is connected to a stand 9 being a joint fixture 10; and the arm 7 carries a lamp socket 11 by means of a joint fixture 12. The joint fixtures 8, 10 and 12 or one or more of them, may embody the features of invention which I will now describe in detail Referring to Figs. 2, 3 and 4 each joint fixture comprises a pair of companion dished disks 13 and 14. The edge 15 of the disk 13 is flared out slightly to accommodate the edge 16 of the disk 14 so that the two disks may slip slightly towards and from each other with a telescoping action.

The central portions 17 and 18 of the two disks are dished inwardly towards each other but do not come into direct contact. A thimble 19 is extended between the central portions 17 and 18. One end of the thimble is flanged over as shown at 20 to receive the outside face of the disk 13; and thereafter the end 21 of the thimble is flanged over to receive the outside face of the disk 14; so that said thimble thus serves as a hub upon which the disks may rotate with respect to each other, and at the same time the disks are prevented from pulling away from each other. Nevertheless the disks may be forced towards each other against any intervening spring member.

The parts including the thimble 19 are so proportioned that when they are assembled together there will be left a sufficient clearance for the accommodation of a pair of spring disks 22 and 23 between them. One of these disks is shown in detail face view in Fig. 4. Each disk has a flattened central annular face 24 which is perforated at 25 to receive the thimble hub, and also includes a flattened annular peripheral face 26. The faces 24 and 26 are offset from each other by an annular intermediate angling section 27. This construction is also well illustrated in the cross section of Fig. 3.

As a consequence when the two disks are set together with their concave faces towards each other their edge portions 26 will come into direct contact leaving an annular chamber or face between the central portions of the disks. Due to the springy nature of the phosphor bronze or other suitable metal from which the disks are made it follows that by exerting pressure against their central portions 24, their edge portions will be forced into firm, even contact with each other under spring pressure; and the amount of this pressure will depend upon the compression initially established by the flanging over of the ends of the thimble 19.

When the joint section is assembled together the thimble is set through one of the disks, for example 13, the two spring disks being set onto the thimble with their concave faces towards each other, and then the other disk 14 is set into place on the thimble. Assuming that the thimble was initially flanged at 20, said flange will serve as an abutment to establish the position of the parts on the thimble. Then by forcing the two disks 13 and 14 towards each other the spring disks 22 and 23 will be compressed slightly and placed under spring compression; and then the other end 21 of the thimble may be flanged over into contact with the outer face of the disk 14. Then when the external pressure on the disks is released it will be found that they are still held by the flanges 20 and 21 of the thimble in such positions as to retain the springs 22 and 23 under the desired pressure.

The relative rotation of the disks 13 and 14 under these conditions will be attended with such an amount of friction as will be desired in a device of this class. Furthermore, it will be found that due to the use of phosphor bronze a smooth sliding action will be insured notwithstanding the existence of the proper amount of pressure between the parts.

The arms 6 and 7 and other parts can be readily secured to the disks 13 and 14 in any convenient manner as for example by means of straps 28 and 29 which are riveted or otherwise secured to said disks.

While I have herein shown and described only a single embodiment of the features of my present invention still I do not intend to limit myself thereto except as I may do so in the claims.

I claim:

1. As a new article of manufacture a swivel joint for the purpose specified comprising a pair of companion cup shaped circular members having their peripheral edge portions of proper size and contour to overlap in telescoping relationship, the central portions of said members being cupped inwardly towards each other, a circular thimble extending through the central portions of said members, said members being pivoted on said thimble, the ends of the thimble being flanged outwardly against the outside faces of the members, and a pair of phosphor bronze spring disks pivotally mounted upon said thimble between the central portions of the members aforesaid, said phosphor bronze spring disks being dished and located with their concave faces together, the peripheral portions of said disks being flattened and in frictional contact with each other and the central portions of said disks being flattened and in contact with the central portions of the cup members, the parts being so proportioned that the phosphor bronze disks are normally under spring compression substantially as described.

2. As a new article of manufacture a swivel joint for the purpose specified comprising in combination a pair of cup shaped members having their peripheral portions freely movable with respect to each other, and having their central portions dished inwardly towards each other, a hub member extending through the central portions of both of the cup members, the cup members being pivotally mounted on the hub member, means in conjunction with the hub member for retaining the cup members thereon and preventing the cup members from separating from each other, and a pair of dish shaped spring disks of phosphor bronze located on the hub member and between the central portions of the disk members, said spring disks being placed with their concave faces towards each other and with their peripheral portions in frictional contact with each other substantially as described.

3. As a new article of manufacture a swivel joint for the purpose specified comprising in combination a pair of cup shaped companion members having their central hub portions dished in towards each other, a hub member on which said central portions are pivotally mounted, means in conjunction with the end portions of said hub member serving to retain the cup members thereon and serving to prevent the cup members from moving outwardly away from each other and a pair of dished spring disks on said hub member between the central portions of the cup members, said spring disks being placed with their concave faces towards each other and with their peripheral portions in frictional contact with each other, substantially as described.

4. As a new article of manufacture a swivel joint for the purpose specified comprising in combination a pair of members rotatable with respect to each other, a hub member on which they are journaled, means in conjunction with the end portions of said hub member serving to retain the members on the hub member and also serving to prevent the members from moving outwardly away from each other, and a pair of dish shaped spring disks located on the hub member between the first mentioned members and with their peripheral portions in frictional contact with each other, substantially as described.

DONALD HOLT.